(12) United States Patent
Löffler

(10) Patent No.: US 6,421,902 B1
(45) Date of Patent: Jul. 23, 2002

(54) METHOD AND DEVICE FOR PRODUCING AND CHECKING SCREWED CONNECTIONS

(76) Inventor: Thomas Löffler, Rosenheimer Str. 62, Miesbach (DE), 83714

( * ) Notice: Subject to any disclaimer, the term of this patent is extended or adjusted under 35 U.S.C. 154(b) by 0 days.

(21) Appl. No.: 09/446,944

(22) PCT Filed: Apr. 30, 1999

(86) PCT No.: PCT/DE99/01276
§ 371 (c)(1),
(2), (4) Date: Mar. 29, 2000

(87) PCT Pub. No.: WO99/57446
PCT Pub. Date: Nov. 11, 1999

(30) Foreign Application Priority Data

Apr. 30, 1998 (DE) .......................................... 198 19 300

(51) Int. Cl.[7] .......................... B23Q 17/00; B23P 21/00; F16B 27/00; G01L 1/00; B25B 23/14
(52) U.S. Cl. ........................ 29/407.02; 29/705; 29/709; 411/916; 81/467; 702/41
(58) Field of Search .............................. 29/407.02, 452, 29/705, 709; 411/916, 917, 412, 413, 402, 410, 414; 81/467; 702/41

(56) References Cited

U.S. PATENT DOCUMENTS

| | | | |
|---|---|---|---|
| 2,571,265 A | 10/1951 | Leufven | 85/32 |
| 3,841,193 A | 10/1974 | Ito | 85/9 |
| 5,030,052 A | * 7/1991 | Anderson et al. | 411/383 |
| 5,827,031 A | * 10/1998 | Swallow | 411/387 |

FOREIGN PATENT DOCUMENTS

| | | |
|---|---|---|
| DE | 2625172 A * | 6/1977 |
| DE | 4017726 A1 | 12/1991 |
| DE | 4025430 A1 | 2/1992 |
| DE | 9303636.1 | 1/1994 |
| DE | 4307633 C1 | 5/1994 |
| DE | 4410722 A1 | 10/1995 |
| DE | 19507391 A1 | 3/1996 |
| GB | 1572152 | 7/1980 |

* cited by examiner

Primary Examiner—S. Thomas Hughes
Assistant Examiner—John C. Hong
(74) Attorney, Agent, or Firm—Jacobson Holman, PLLC

(57) ABSTRACT

A method of producing and checking a screw connection of parts by a screw under the effect of a predetermined initial tension force. Moreover, a connecting device controls the sequence of process steps automatically. A screw is especially designed for the use together with the connecting device. The effective initial tension force within the screw shaft is measured during production of the connection by a pulling force measuring device, for instance a wire strain gauge, arranged at a screw head pulling device of the connecting device. A predetermined initial tension force can be produced first by pulling on a screw head, and then maintained by tightening the screw so far that the screw head contacts a contact area outside of one of the parts to be connected.

6 Claims, 2 Drawing Sheets

METHOD AND DEVICE FOR PRODUCING AND CHECKING SCREWED CONNECTIONS

FIELD OF THE INVENTION

This invention relates to a method and a device for producing and checking screwed connections and it can be used preferably in assembly operations in industrial production, in workshop operation and for monitoring purposes in plant engineering when there are strict safety requirement. This invention also relates to special screws for implementing the inventive method.

BACKGROUND OF THE INVENTION

It is known from the state of the art that electronically controlled screw systems are being used more and more frequently in industrial production. They have a drive unit and a tool spindle with a screw tool which tightens a screw with a predetermined torque to press the parts to be joined at a predetermined force. This force is known as the initial tension force, and it occurs due to the change in length of the screw shaft, which will hereinafter be referred to as elongation. In many applications, it is necessary to adjust the initial tension force to a predetermined level with the greatest possible accuracy. To do so, the initial tension force must be determined. The state of the art is to determine the initial tension force indirectly by measuring the torque while tightening a screw. Mainly torque and angle of rotation measuring systems integrated into the screw system are used to produce a screwed connection. When a preset torque is reached in tightening the screw, a signal output by the torque measuring system is used to shut down the drive unit, or the screw is tightened further by a predetermined angle of rotation determined by the angle of rotation measuring system.

The following problem occurs in indirect determination of the initial tension force by measuring the torque: When a screw is tightened, only a small portion of the applied torque is effective in elongating the screw, i.e., in producing the initial tension force. Most of the torque is overcome by friction on the screw thread and the screw head. If the frictional conditions change, these changes have a great effect on the initial tension force. Therefore, the equipment described above cannot guarantee that strict tolerances will be maintained in the initial tension force.

To overcome these problems, the initial tension force must be measured directly. Various methods and devices have been proposed for this purpose. It is known that a measurement ring in the form of a washer can be placed beneath the screw head. This measurement ring is a sensor which delivers an electric signal when a force is acting. When the screw is tightened, the screw head presses against the measurement ring, so the initial tension force can be measured directly. This method is very cost-intensive, because the measurement ring remains beneath the screw head after tightening the screwed connection. Therefore, this method is limited only to special applications, e.g., in space travel or in nuclear engineering. Continuous long-term monitoring of the pressing force with measurement rings is possible only to a limited extent, because they have an uncontrollable zero drift.

Another possibility for determining the initial tension force is described in German Patent No. 4,410,722, which describes a device for determining initial tension force by determining the distance between a coil through which an a.c. current is flowing and the screw head of a screw, said distance changing as the screw is tightened. This change in distance is measured. It is approximately proportional to the initial tension force. This does not permit detection of changes in length caused by plastic deformation of the shaft. The lengths to be measured are so small that this method can hardly be used at all under rough production conditions or it can be used only with considerable technical expense.

German Patent No. 4,017,726 describes a fastening screw having a shaft provided at least partially with a thread and an operating end on which there is a head, a pin piece or the like, with a first end face being provided on the operating end of the fastening screw and a second end face being provided on the free end of the shaft, and with measurement faces for an ultrasonic measurement being provided on both end faces, extending over only a portion of the end faces and arranged with an axial offset to the end faces in the sense of an elevation and/or depression. With this device, the change in length of the screw is measured by ultrasonic means. The initial tension force is determined directly from the material characteristics and the geometric dimensions of the screw by using methods known to those skilled in the art. The objects of German Patent No. 19,507,391 and German Patent No. 4,025,430 are based on the same principle. However, there are disadvantages to determining the change in length of the screw by ultrasonic means. To determine the change in length accurately, the ultrasonic beam must be aimed into the screw in a defined manner. The technical problems to be solved in this way are considerable. It is thus necessary to design the sound conduction surface and the reflection surface to particular specifications. In particular, these surfaces must be manufactured to a high precision with a narrow tolerance. Standard screws cannot meet these standards. Screws are manufactured as mass-produced parts by means of high-efficiency methods. No comparable methods are available for manufacturing screws with ultrasonic conduction surfaces. Therefore, the manufacturing costs for these special screws are high.

In addition, there is a known method where the screw is pushed through the parts to be joined and then a nut is screwed onto it. The end section of the threaded bolt of the screw then projects above the nut. This end section is detected with a suitable device and is tightened in the direction of the end section. The device is supported on the sheet metal against which the nut will later also rest. The screw is then pretightened by the device with a certain force which can be determined with a high precision. The nut can be screwed until the head is in contact with it with practically no torque. When the device is then removed, the strained screw shaft then contracts the parts at the initial stress force by means of the screw head and the nut. Thus, a screw and a nut are always required for this method. Therefore, automation is difficult.

SUMMARY OF THE INVENTION

The object of the present invention is to produce a screwed connection with high precision without the use of a nut.

This object is achieved with a
  production method, having a
  device and a
  screw.

The production method for screwed connections according to the present invention has the following process steps:
  screwing in the screw by means of a screwdriver and stopping the tightening process before reaching the desired initial tension force,
  arranging a screw head pulling device supported on the surface of the top part with which the screw head can be pulled in the axial direction, pulling the screw head in the axial direction by means of the screw head pulling device until reaching the required initial tension force and holding the required initial tension force, continuing the tightening of the screw while maintaining the required initial tension force until the screw head is in contact with the top part, where predetermined criteria are used to determine when contact of the screw head with the top part is achieved and when the screw tightening process is to be stopped.

The main advantage of this method is that the initial tension force is measured and applied directly and is almost free of measurement errors occurring under the effect of the friction in the thread and/or on the screw head.

Advantageous refinements of this method can be derived from claims 2 through 4.

In one embodiment according to, the present invention, the screwdriver is driven by a variable-speed drive. This embodiment is preferably used in automated assembly. The screw is tightened by using a hand-operated tool. This embodiment of the method allows the production of screwed connections with an initial tension force with a narrow tolerance in workshop operations where screwed connections are released and tightened by hand, especially in making repairs. Another area of use is for assembly in aviation and space technology and in reactor technology, where high-precision screwed connections must be produced.

It is possible to combine the measured initial tension force with measured quantities known from the state of the art, such as torque, angle of rotation and/or screw depth. If necessary, it is also possible to combine more than two measured quantities.

The device according to the present invention has the following features:

- a pulling device for pulling the screw head in the axial direction, supported on the exterior surface of the first part, where the screw head is designed so that the pulling device can act in a frictionally engaged or form-fitting manner,
- a force measuring device with electric output of the measured value for direct or indirect measurement of the tensile force acting on the screw head in the axial direction,
- an electronic data processing unit which converts the force measurement values output into electric signals and supplies them for further processing, and
- a control unit for controlling the screw tightening device by means of the electric signals of the electronic data processing unit.

Advantageous refinements can be derived, according to which the tension device is designed as a screw device with an inside thread or an outside thread or as a gripping device with gripping claws. A tensile force control device may be provided to maintain a uniform tensile force.

A screw for carrying out the method according to this invention by means of the device according to this invention has a design on the screw head which can be actively engaged with the tension device. This design may be an inside thread or an outside thread, a recess or a ring flange. It is crucial for an active engagement with the tension device to be possible.

BRIEF DESCRIPTION OF THE DRAWINGS

Additional measures and advantages of this invention are derived from the following description of the embodiments in combination with the accompanying schematic diagram, where this invention is aimed at all new features or combinations of features that can be derived therefrom even if they are not specified explicitly in the claims.

DETAILED DESCRIPTION OF THE PREFERRED EMBODIMENTS

Figure 1:
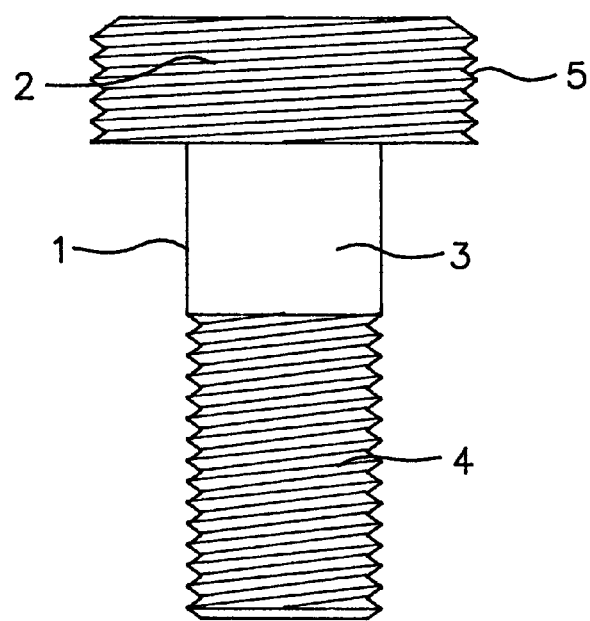
FIG. 1 shows a first embodiment of a special screw according to this invention.

FIG. 1 shows a first embodiment of the special screw 1 according to this invention with a screw head 2, a threadless shaft section 3, a threaded shaft 4 and a head thread 5 on screw head 2.

Figure 2:
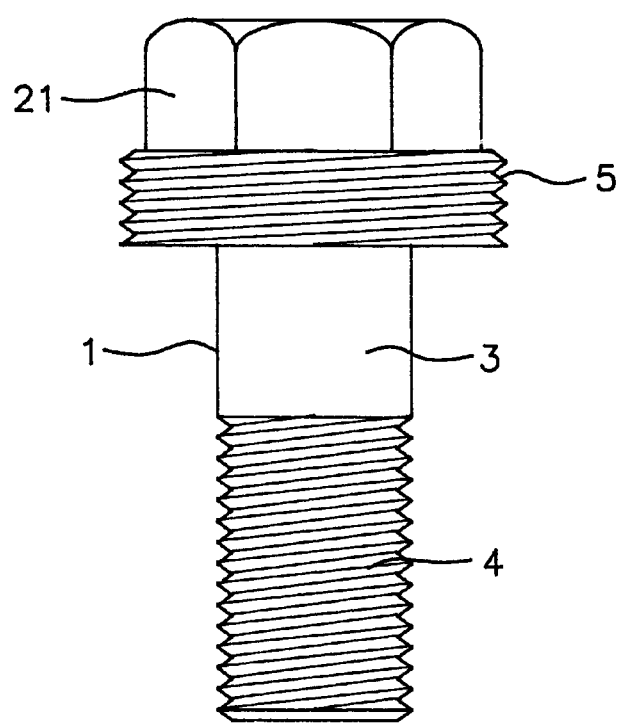
FIG. 2 shows a second embodiment of the special screw according to this invention.

FIG. 2 shows a seconds embodiment of the special screw 1 according to this invention. Special screw 1 has key faces in the form of an outside hexagon plug 21 for application of an external force by a screw driver.

A first variant of production of a screwed connection will now be described.

Figure 3:
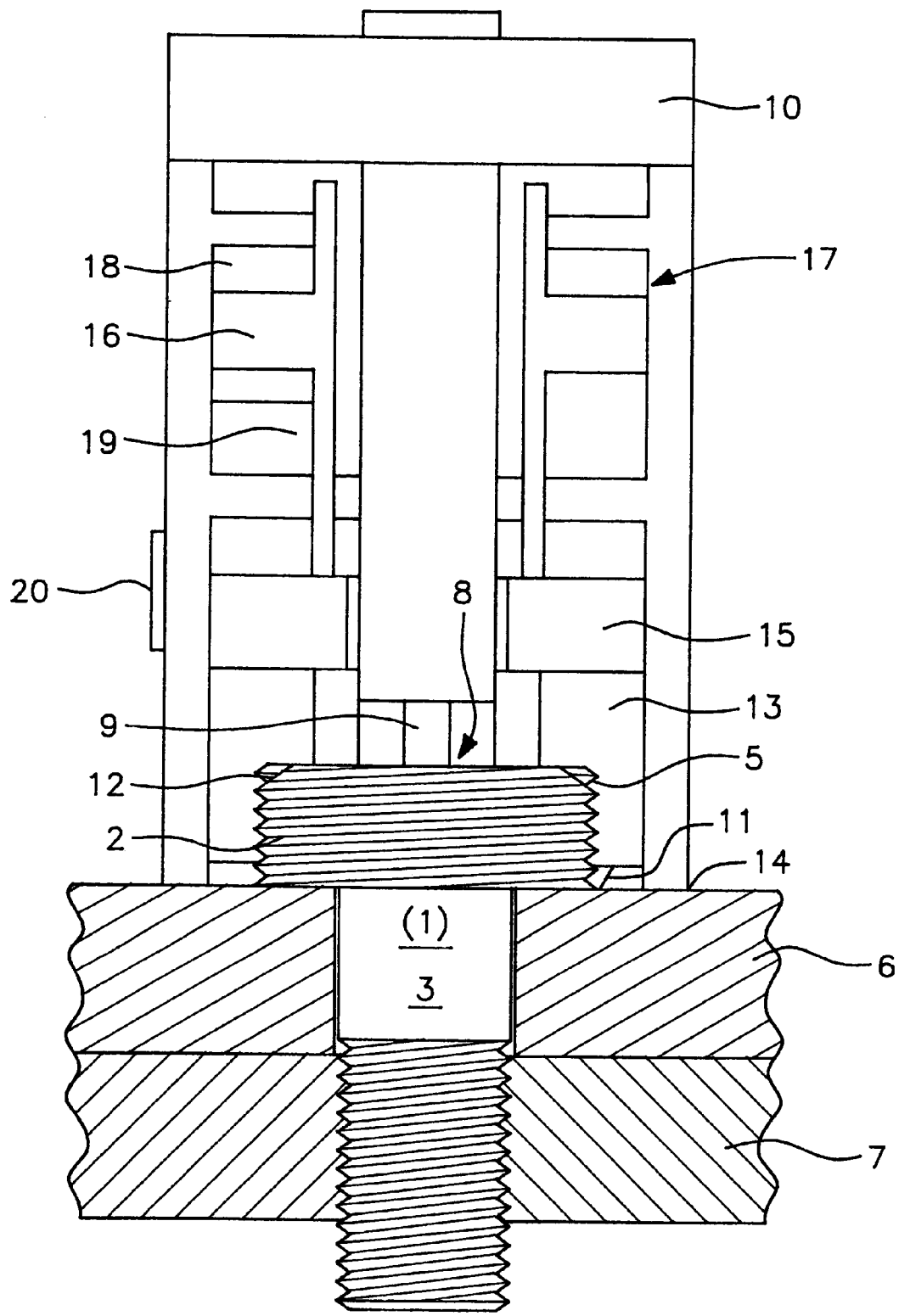
FIG. 3 shows a special screw and a tension device.

According to FIG. 3, two parts 6 and 7 are to be joined. A special screw 1 with a head thread 5 and a an interior hexagon head socket 8 are provided as joining elements. Special screw 1 is tightened by means of a tool 9 fitting the hexagon head socket 8 by means of a driving device 10 until it comes to rest against the head 11, where it is ensured that the initial tension force to be achieved for this screwed connection is not yet reached. Then a screw head pulling device 12 is pulled onto the screw head 2 with head thread 5. If necessary, the special screw 1 can be attached to the interior hexagon head socket 8. The screw head pulling device 12 consists of a tension head 13, a supporting ring 14, a drive device 15 for turning the tension head 13 and a hydraulic piston 16 which can move up and down in a cylinder 17 with chambers 18 and 19 and is connected to tension head 13. When pressure acts on the chamber 18, the hydraulic piston 16 moves up, pulling on screw head 2 with tension head 13 at a predetermined force F1 until the intended initial tension has been reached in shaft section 3 of special screw 1. At the same time, the supporting ring 14 is pressed with force F1 onto part 6. Force F1 is determined with a high accuracy by means of wire strain gauges 20, which in this embodiment are arranged on the outer perimeter of the supporting ring 14. The wire strain guages 20 may be arranged at locations that are to be selected by those skilled in the art on the basis of design aspects and the measurement technology. The special screw 1 is now tightened under the initial tension force until in contact with the head 11, whereupon the head contact 11 is detected with a torque measurement device in this embodiment. Head contact 11 can also be detected with other means, e.g., by the power consumption of drive until 10. Then the hydraulic pressure acting in hydraulic cylinder 17 is reduced and the screw head pulling device 12 is unscrewed.

What is claimed is:

1. A method of producing and checking a screw connection under a predetermined initial tension force defined with a narrow tolerance within a screw of the screw connection, the connection including a first part having a hole without any thread, and a second part having a hole with a thread, the first part and the second part are pressed together by the screw at the predetermined initial tension force, the screw having a screw head and a screw shaft with a threaded portion, the screw shaft traversing the first part through the hole thereof, and being screwed into the threaded hole within the second part, the screw head pressing the first part to the second part with said predetermined initial tension force when the screw head rests on an exterior surface of the first part at a contact area thereof when the screw is tightened so far that the predetermined tension force is effected within the screw shaft, the method comprising the following process steps:

positioning a screw head pulling device for seizing the screw head and pulling the screw head in an axial direction of the screw shaft away from said contact area of said first part;

pulling the screw head by the screw head pulling device in the axial direction of the screw shaft away from said contact area with a pulling force equal to the initial predetermined tension force effective within the screw shaft;

measuring the pulling force which is equal to the predetermined initial tension force effective in the screw shaft when the screw head does not rest on the contact area on the first part (6);

pulling the screw head further away from said contact area elongating the screw shaft with a pulling force equal to the predetermined initial tension force and holding the pulling force during a next process step;

tightening the screw while maintaining the pulling force equal to the predetermined initial tension force until the screw head comes again into contact with the contact area of the first part without substantially pressing on said first part, and using predetermined criteria to determine when said contact is achieved; and terminating the process step of pulling the screw head so that said screw head rests on the contact area and transfers a pressing force to the first part, the pressing force being equal to the predetermined initial tension force previously produced within the screw shaft by the process steps of pulling and tightening.

2. The method according to claim 1, wherein the initial tension force is checked by measuring the pulling force when the screw head is pulled and in contact with the contact area of the first part without substantially pressing on said first part, and additionally checking by measuring the angle of rotation and/or the torque when the screw is tightened.

3. A connecting device for producing and checking a screw connection under the effect of a predetermined initial tension force within a screw of the connection, the connection including a first part having a hole without any thread and a second part having a hole with a thread, the first part and the second part being pressed together by the screw, the screw having a screw head and a screw shaft with a threaded portion, the screw shaft traversing the first part through the hole thereof and being screwed into the threaded hole within the second part, the screw head pressing the first part to the second part with said predetermined initial tension force when the screw head rests on an exterior surface of the first part at a contact area thereof when the screw is tightened so far that the predetermined tension force is effected within the screw shaft, the connecting device comprising:

a screw tightening device for screwing and tightening the screw and having a variable-speed drive unit and a screw driving tool;

a screw head pulling device for seizing the screw head and for pulling the screw head in an axial direction of the screw shaft away from the contact area of the first part, said screw head pulling device comprising a screw head seizing tool for seizing the screw head in at least one of a force-engaged and a form-fitting manner;

a pulling force measuring device supplying measured electric values for direct or indirect measurement of a pulling force acting on the screw head, the pulling force being equal to the predetermined initial tension force effected in the screw shaft when the screw head does not rest on the contact area;

the measured electric values which are supplied by the pulling force measuring device being converted into electric signals for controlling processes of producing and checking the screw connection;

the screw tightening device being controlled by said electric signals; and the screw head pulling device being controlled to produce a definite pulling force as measured by the pulling force measuring device, and to maintain a predetermined pulling force.

4. The connecting device according to claim 3, wherein a pulling driver is operative on the screw head seizing tool.

5. The connecting device according to claim 3, wherein the screw head seizing tool is a gripping device having gripping claws for gripping the screw head at a ring flange.

6. The connecting device according to claim 3, wherein the screw head pulling device comprises a turning driver for turning the screw head seizing tool which is a screwing tool with an inside thread adapted to meet a complementary head thread on the periphery outside of the screw head.

\* \* \* \* \*